United States Patent
Zhu et al.

(10) Patent No.: US 12,252,760 B1
(45) Date of Patent: Mar. 18, 2025

(54) SEPARATION PROCESS OF METALS COPPER ANODE SLIME BASED ON OXIDATION POTENTIAL MODULATION

(71) Applicant: Institute of Process Engineering, Chinese Academy of Sciences, Beijing (CN)

(72) Inventors: Tingyu Zhu, Beijing (CN); Yang Yang, Beijing (CN); Wenqing Xu, Beijing (CN); Guanjiang Yang, Beijing (CN); Xue Wang, Beijing (CN); Feng Qi, Beijing (CN)

(73) Assignee: Institute of Process Engineering, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/893,145

(22) Filed: Sep. 23, 2024

(30) Foreign Application Priority Data

Dec. 4, 2023 (CN) .......................... 202311649231.0

(51) Int. Cl.
  C22B 11/00 (2006.01)
  C22B 7/00 (2006.01)

(52) U.S. Cl.
  CPC ............ C22B 11/046 (2013.01); C22B 7/007 (2013.01)

(58) Field of Classification Search
  CPC ............................. C22B 11/046; C22B 7/007
  USPC .......................................................... 75/426
  See application file for complete search history.

(56) References Cited

U.S. PATENT DOCUMENTS

| 2005/0255017 A1 | 11/2005 | Okada et al. |
| 2007/0022840 A1 | 2/2007 | Heguri et al. |

FOREIGN PATENT DOCUMENTS

| CN | 105112668 A | 12/2015 |
| CN | 109402392 A | 3/2019 |
| CN | 109943727 A | 6/2019 |
| CN | 110578059 A | 12/2019 |
| CN | 111575483 A | 8/2020 |
| CN | 113277483 A | 8/2021 |
| CN | 116479253 A | 7/2023 |
| CN | 116622992 A | 8/2023 |
| JP | 2001316735 A | 11/2001 |
| KR | 102515327 B1 | 3/2023 |

OTHER PUBLICATIONS

First Office Action for China Application No. 202311649231.0, mailed Apr. 16, 2024.

(Continued)

*Primary Examiner* — Melissa S Swain
(74) *Attorney, Agent, or Firm* — Piloff Passino & Cosenza LLP; Rachel Pilloff; Sean Passino

(57) ABSTRACT

Disclosed is separation process of valuable metals from copper anode slime based on oxidation potential modulation, belonging to the technical field of industrial solid waste resource utilization. The differences in redox properties of different metal elements are used to precisely regulate the oxidation potential and acidity of the leaching solution by regulating the amount of oxidizing agent and acid added, so as to selectively and graded leaching and separating the copper (Cu), selenium (Se), tellurium (Te), and silver (Ag) metal elements, and the oxidants used are substances such as $H_2O_2$, $O_2$ and $O_3$.

3 Claims, 1 Drawing Sheet

(56) References Cited

OTHER PUBLICATIONS

Notification to Grant Patent for China Application No. 202311649231.0, mailed Jun. 14, 2024.
First Search Report for China Application No. 202311649231.0, dated Apr. 10, 2024.
Supplementary Search Report for China Application No. 202311649231.0, dated Jun. 5, 2024.

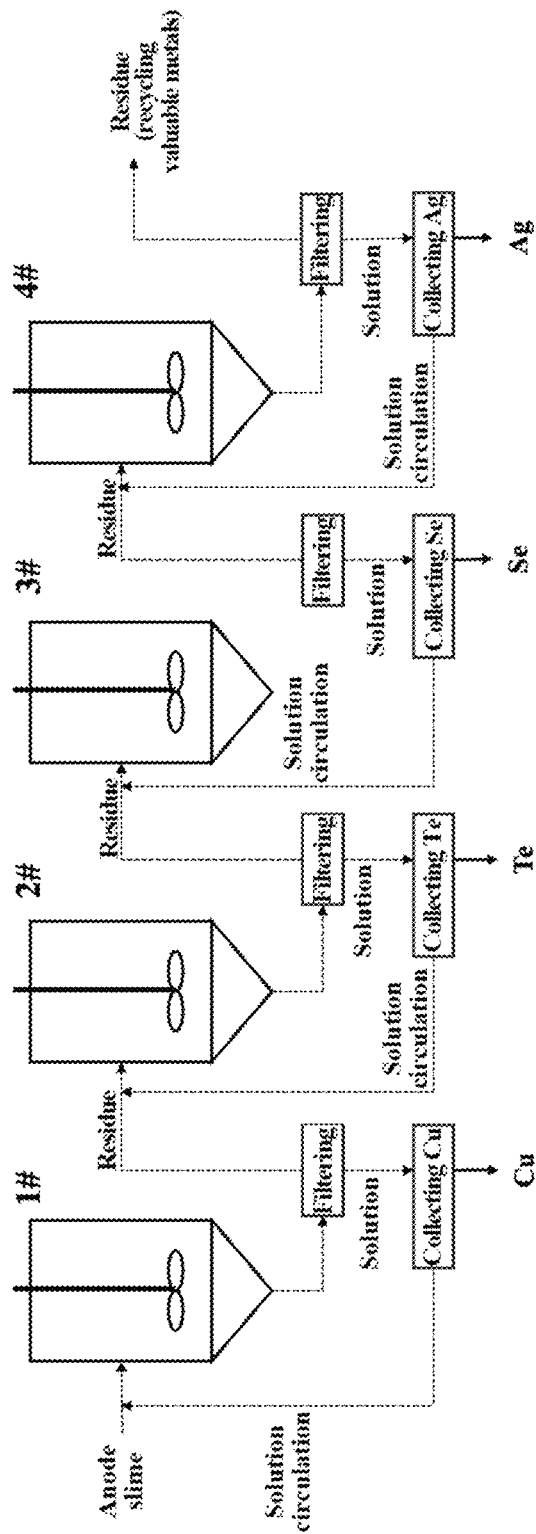

SEPARATION PROCESS OF METALS COPPER ANODE SLIME BASED ON OXIDATION POTENTIAL MODULATION

CROSS-REFERENCE TO RELATED APPLICATIONS

This application claims priority to Chinese Patent Application No. 202311649231.0, filed on Dec. 4, 2023, the contents of which are hereby incorporated by reference.

TECHNICAL FIELD

The present disclosure belongs to the technical field of industrial solid waste resource utilization, and particularly relates to a separation process of valuable metals from copper anode slime based on oxidation potential modulation.

BACKGROUND

More than 80% of China's copper production uses pyrometallurgical smelting process, whose procedures includes roasting, smelting, blowing, oxidative refining and electrolytic refining. Electrolysis is one of the key processes in copper smelting. Electrolysis is one of the key processes in copper smelting, where 98-99% of the copper in the anode plate is dissolved in the electrolyte consisting of 130-220 grams per liter (g/L) $H_2SO_4$ and $Cu^{2+}$, while $Cu^{2+}$ obtains electrons at the cathode and is reduced, and cathode copper with a grade of more than 99.95% is formed on the cathode plate. The yield of anode slime is 0.2-1.0% of the weight of anode plate, and the national output of China is more than 70,000 tons/year. There are many kinds of valuable metal elements such as silver (Ag), gold (Au), copper (Cu), selenium (Se), tellurium (Te) and so on richly contained in anode slime, and the above mentioned metal elements all play key roles in the fields of solar cells, optoelectronic devices, medical field, semiconductor industry, information technology, and new materials. In the field of copper anode slime, scholars in China have been working on the development of new processes aimed at highly selective separation of different metals for efficient and high-purity recovery.

In the traditional wet treatment process of anode slime, acid leaching is used to transfer copper (Cu), selenium (Se), tellurium (Te), silver (Ag) and other metals to the leaching solution, and the subsequent separation and recovery of various metal elements are carried out respectively in turn. As there are many types of metal elements in the leaching solution, the elements interfere with each other during the process of separation and recovery, with poor separation selectivity and prolonged process flow.

LI Yan et al. disclosed a method for separating selenium, tellurium, arsenic, copper, lead and silver and enriching gold from copper anode slime (CN111575483A), including reacting the roasted product obtained from low-temperature oxidation roasting of copper anode slime with sodium hydroxide to obtain selenium-tellurium-arsenic-containing leaching solution and alkaline leaching residue, reacting the leaching solution with limewater to obtain selenium-tellurium-containing solution and calcium arsenate residue, reacting the alkaline leaching residue with sulphuric acid to obtain copper sulfate and acid leaching residue, reacting sulphuric acid with the selenium-tellurium-containing solution to obtain telluric acid and selenium-containing solution, reacting the acid leaching residue with nitric acid to obtain silver nitrate solution and lead-gold residue, reacting the silver nitrate with hydrochloric acid to obtain silver chloride and nitric acid, reacting the lead-gold residue with sodium carbonate solution to obtain carbonized residue and sodium sulphate solution, reacting the carbonized residue with nitric acid to obtain lead nitrate solution and gold-containing enrichment, and reacting the lead nitrate solution with sulphuric acid to obtain lead sulphate and nitric acid solution. In this method, the anode slime needs to be oxidized and roasted at 250-350 degrees Celsius (° C.) first, which consumes high energy.

HU Jianhui et al. disclosed a method for leaching and separating antimony and tellurium from copper anode slime through controlling potential (CN110578059A), which adopts a process of "anode slime decopperization-controlled potential leaching of antimony and inhibition of tellurium leaching-two-stage countercurrent chlorination leaching-controlled potential reduction" to treat copper anode slime, and in the process of antimony leaching, the leaching rate of antimony is greatly improved by controlling the redox potential of the solution, the loss rate of tellurium is reduced, and the efficient separation of antimony and tellurium and the efficient enrichment of tellurium are realized; however, this method only involves the separation and recovery of antimony and tellurium, and does not involve any other elements; moreover, the method uses chlorine-containing compounds to regulate the oxidation potential, which not only involves the risk of generating $Cl_2$, but also makes it difficult to dispose of chlorinated wastewater.

DU Wenming et al. disclosed an oxidation leaching method of tin-copper residue and anode slime (CN116622992A), in which tin-copper residue, tin anode slime, copper anode slime, and lead anode slime are added to a calciner to be calcined, so as to obtain a calcined mixture; the calcined mixture is added to a pulverizer to pulverize to obtain a mixed powder; and the mixed powder and dilute sulfuric acid are added into a leaching extraction device according to the weight ratio of 1:5, followed by mixing, and then oxygen is introduced into the extraction device for treatment to obtain a leaching solution I and a leaching residue I. In this method, the selective leaching of metal elements is realized, and the selectivity of element separation is poor.

SUMMARY

Aiming at the shortcomings of the prior art, the present disclosure provides a separation process of valuable metals from copper anode slime based on oxidation potential modulation. Using the differences in redox properties of different metal elements, the oxidation potential of the leaching solution is precisely regulated by regulating the amount of oxidant added to realize the selective gradient leaching and separation of metal elements such as copper (Cu), selenium (Se), tellurium (Te), and silver (Ag), so as to effectively improve the selectivity of element separation; in addition, the process has good greenness by using oxidizers such as $H_2O_2$, $O_2$ and $O_3$, and the products after the reaction of oxidizers are harmless $H_2O$ and oxygen.

In order to achieve the above objectives, the present disclosure provides the following technical schemes.

A separation process of valuable metals from copper anode slime based on oxidation potential modulation, including following steps:

mixing copper anode slime with acidic leaching solution with $H^+$ concentration of 3.0-8.0 mole per liter (mol/L), adding an oxidant to control an oxidation potential to 400-500 millivolts (mV), and leaching Cu elements; filtering to obtain a filter residue, followed by mixing with an acidic leaching solution with a $H^+$ concentration of 8.0-10.0 mol/L, adding an oxidant to control an oxidation potential to 650-850 mV, and leaching Te elements; filtering to obtain a filter residue, followed by mixing with an acidic leaching solution with a $H^+$ concentration of 1.0-4.0 mol/L, adding an oxidant to control an oxidation potential to 800-1,200 mV, and leaching Se elements; filtering to obtain a filter residue, followed by mixing with a solution of thiosulfate with a concentration of 0.025-0.05 mol/L of $S_2O_3^{2-}$ to complex Ag elements.

Optionally, in a process of leaching Cu elements, the oxidant is one or more of $H_2O_2$, $O_3$ and $O_2$; and an acid of the acidic leaching solution is sulfuric acid.

Optionally, in the process of Cu elements, a leaching duration is 10-20 minutes (min) and a leaching temperature is 30-80° C.

More optionally, in the process of leaching Cu elements, the oxidant is $H_2O_2$.

Optionally, in a process of leaching Te elements, the oxidant is one or more of $H_2O_2$, $O_3$ and $O_2$; and an acid of the acidic leaching solution is sulfuric acid.

Optionally, in the process of leaching Te elements, a leaching duration is 60-120 min and a leaching temperature is 30-60° C.

More optionally, in the process of leaching Te elements, the oxidant is $H_2O_2$.

Optionally, in a process of leaching Se elements, the oxidant is one or more of $H_2O_2$, $O_3$ and $O_2$; and an acid of the acidic leaching solution is sulfuric acid.

Optionally, in the process of leaching Se elements, a leaching time is 60-120 min and a leaching temperature is 30-60° C.

More optionally, in the process of leaching Se elements, the oxidant is $H_2O_2$.

Optionally, in a process of complexing Ag elements, the thiosulfate is sodium thiosulfate and/or potassium thiosulfate.

Optionally, in the process of complexing Ag elements, a reaction duration is 30-90 min, and a reaction temperature is 50-80° C.

The beneficial technical effects of the present disclosure are as follows.

By simultaneously regulating the oxidation potential and the concentration of acid, the present disclosure enables the selective leaching and separation of different metal elements in copper anode slime in sequence, and the operation of the technology is simple and the parameters are easy to control. On the one hand, the leaching rate of the element is enhanced, and on the other hand, the content of impurity elements in the target element is reduced through selective leaching, so that a recovery product with higher purity is obtained. By adopting the present disclosure, the leaching rate of the elements achieves >99%, and the purity of the metal elements in the recovered product may be greater than 99.9%.

BRIEF DESCRIPTION OF THE DRAWINGS

The figure is a process illustrating the process for selectively separating valuable metals from copper anode slime in an embodiment of the present disclosure.

DETAILED DESCRIPTION OF THE EMBODIMENTS

A number of exemplary embodiments of the present disclosure will now be described in detail, and this detailed description should not be considered as a limitation of the present disclosure, but should be understood as a more detailed description of certain aspects, characteristics and embodiments of the present disclosure. It should be understood that the terminology described in the present disclosure is only for describing specific embodiments and is not used to limit the present disclosure.

In addition, for the numerical range in the present disclosure, it should be understood that each intermediate value between the upper limit and the lower limit of the range is also specifically disclosed. Intermediate values within any stated value or stated range, as well as each smaller range between any other stated value or intermediate values within the stated range are also included in the present disclosure. The upper and lower limits of these smaller ranges can be independently included or excluded from the range.

Unless otherwise specified, all technical and scientific terms used herein have the same meaning as commonly understood by one of ordinary skill in the art to which this present disclosure relates. Although the present disclosure only describes the preferred methods and materials, any methods and materials similar or equivalent to those described herein may also be used in the practice or testing of the present disclosure.

The terms "including", "comprising", "having" and "containing" used in this specification are all open terms, which means including but not limited to.

The process flow chart of selective separation of valuable metals from copper anode slime in the embodiments of the present disclosure is shown in the figure.

The anode slime used in this process embodiment comes from Southwest Copper Branch of Yunnan Copper Group Co., Ltd., and the contents of main elements in anode slime are measured as shown in Table 1:

TABLE 1

| | Element | | | |
| --- | --- | --- | --- | --- |
| | Cu | Te | Se | Ag |
| Elemental content (%) | 21.01 | 1.59 | 6.73 | 9.12 |

Embodiment 1

The process for selectively separating valuable metals from copper anode slime includes the following steps:

$H_2SO_4$ is used as the leaching solution, and $H_2O_2$ is used to control the oxidation potential of oxidative leaching solution;

(1) a copper anode slime and a leaching solution are mixed and stirred in a reactor 1 #, with the reaction duration being controlled at 12 min, the temperature being controlled at 50° C., the concentration of sulfuric acid being controlled at 1.75 mol/L, and the liquid-solid ratio being controlled at 6 millilitre per gram (mL/g); by adding oxidant $H_2O_2$, the oxidation potential is controlled at 420±10 mV, so that selective leaching of Cu elements is realized, and the leaching residue enters a reactor 2 #;

(2) in the reactor 2 #, the reaction duration is controlled at 80 min, the temperature is controlled at 40° C., the sulfuric acid concentration is controlled at 4.25 mol/L, and the liquid-solid ratio is controlled at 4 mL/g; by adding oxidant $H_2O_2$, the oxidation potential is controlled at 680±10 mV, and the selective leaching of Te elements is realized, and the leaching residue enters a reactor 3 #;

(3) in the reactor 3 #, the reaction duration is controlled at 80 min, the temperature is controlled at 40° C., the concentration of sulfuric acid is controlled at 1.0 mol/L, and the liquid-solid ratio is controlled at 4 mL/g; by adding oxidant $H_2O_2$, the oxidation potential is controlled at 850±10 mV, so as to realize the selective leaching of Se elements, and the leaching residue enters a reactor 4 #; and (4) in the reactor 4 #, the reaction duration is controlled at 40 min and the temperature is controlled at 60° C.; a 0.03 mol/L $Na_2S_2O_3$ solution is used in the process, and the liquid-solid ratio of $Na_2S_2O_3$ to the leaching residue is 8 mL/g, so that $Ag^+$ is complexed from the leaching residue.

The ion concentrations of leaching solutions for different phases are determined by inductively coupled plasma optical emission spectrometry (ICP-OES), and the leaching rates of Cu, Te, Se, and Ag are 99.43%, 99.71%, 99.05%, and 99.18%, respectively, with the realization of graded and efficient leaching and highly selective separation of each element.

Embodiment 2

The process for selectively separating valuable metals from copper anode slime includes the following steps:

$H_2SO_4$ is used as the leaching solution, and $H_2O_2$ is used to control the oxidation potential of oxidative leaching solution;

(1) the copper anode slime and the leaching solution are mixed and stirred in the reactor 1 #, the reaction duration is controlled at 18 min, the temperature is controlled at 50° C., the concentration of sulfuric acid is controlled at 2.25 mol/L, and the liquid-solid ratio is controlled at 6 mL/g; by adding the oxidant $H_2O_2$, the oxidation potential is controlled at 420±10 mV, so that selective leaching of Cu elements is realized, and the leaching residue enters the reactor 2 #;

(2) in the reactor 2 #, the reaction duration is controlled at 100 min, the temperature is controlled at 40° C., the sulfuric acid concentration is controlled at 4.75 mol/L, and the liquid-solid ratio is controlled at 4 mL/g; by adding oxidant $H_2O_2$, the oxidation potential is controlled at 680±10 mV, and the selective leaching of Te elements is realized, and the leaching residue enters the reactor 3 #;

(3) in the reactor 3 #, the reaction duration is controlled at 100 min, the temperature is controlled at 40° C., the concentration of sulfuric acid is controlled at 1.5 mol/L, and the liquid-solid ratio is controlled at 4 mL/g; by adding the oxidant $H_2O_2$, the oxidation potential is controlled at 850±10 mV to realize the selective leaching of Se elements, and the leaching residue enters the reactor 4 #; and (4) in the reactor 4 #, the reaction duration is controlled at 50 min and the temperature is controlled at 60° C.; in the process, a 0.04 mol/L $Na_2S_2O_3$ solution is used, and the liquid-solid ratio of $Na_2S_2O_3$ to the leaching residue is 8 mL/g, and the $Ag^+$ is complexed from the leaching residue.

The ion concentrations of leaching solutions for different phases are determined by ICP-OES, and the leaching rates of Cu, Te, Se, and Ag are 99.70%, 99.81%, 99.11% and 99.46%, respectively, with the realization of graded and efficient leaching and highly selective separation of each element.

Embodiment 3

The process for selectively separating valuable metals from copper anode slime includes the following steps:

$H_2SO_4$ is used as the leaching solution, and $H_2O_2$ is used to control the oxidation potential of oxidative leaching solution;

(1) the copper anode slime and the leaching solution are mixed and stirred in the reactor 1 #, the reaction duration is controlled at 12 min, the temperature is controlled at 70° C., the concentration of sulfuric acid is controlled at 2.25 mol/L, and the liquid-solid ratio is controlled at 6 mL/g; by adding the oxidant $H_2O_2$, the oxidation potential is controlled at 480±10 mV, so that the selective leaching of Cu elements is realized, and the leaching residue enters the reactor 2 #;

(2) in the reactor 2 #, the reaction duration is controlled at 80 min, the temperature is controlled at 50° C., the sulfuric acid concentration is controlled at 4.75 mol/L, and the liquid-solid ratio is controlled at 4 mL/g; by adding the oxidant $H_2O_2$, the oxidation potential is controlled at 780±10 mV, and the selective leaching of Te elements is realized, and the leaching residue enters the reactor 3 #;

(3) in the reactor 3 #, the reaction duration is controlled at 80 min, the temperature is controlled at 50° C., the concentration of sulfuric acid is controlled at 1.5 mol/L, and the liquid-solid ratio is controlled at 4 mL/g; by adding oxidant $H_2O_2$, the oxidation potential is controlled at 950±10 mV, so as to realize the selective leaching of Se elements, and the leaching residue enters the reactor 4 #; and (4) in the reactor 4 #, the reaction duration is controlled at 40 min and the temperature is controlled at 70° C.; in the process, a 0.04 mol/L $Na_2S_2O_3$ solution with a liquid-solid ratio of 10 mL/g to the leaching residue is used to complex $Ag^+$ from the leaching residue.

The ion concentrations of leaching solutions for different phases are determined by ICP-OES, and the leaching rates of Cu, Te, Se, and Ag are 99.32%, 99.45%, 99.01% and 99.42%, respectively, with the realization of graded and efficient leaching and highly selective separation of each element.

Embodiment 4

The process for selectively separating valuable metals from copper anode slime includes the following steps:

$H_2SO_4$ is used as the leaching solution, and $H_2O_2$ is used to control the oxidation potential of oxidative leaching solution;

(1) the copper anode slime and the leaching solution are mixed and stirred in the reactor 1 #, the reaction duration is controlled at 18 min, the temperature is controlled at 70° C., the concentration of sulfuric acid is controlled at 1.75 mol/L, and the liquid-solid ratio is controlled at 6 mL/g; by adding the oxidant $H_2O_2$, the oxidation potential is controlled at 480±10 mV, so that the selective leaching of Cu elements is realized, and the leaching residue enters the reactor 2 #;

(2) in the reactor 2 #, the reaction duration is controlled at 100 min, the temperature is controlled at 50° C., the sulfuric acid concentration is controlled at 4.25 mol/L, and the liquid-solid ratio is controlled at 4 mL/g; by adding the oxidant $H_2O_2$, the oxidation potential is controlled at 780±10 mV, and the selective leaching of Te elements is realized, and the leaching residue enters the reactor 3 #;

(3) in the reactor 3 #, the reaction duration is controlled at 100 min, the temperature is controlled at 50° C., the concentration of sulfuric acid is controlled at 1.0 mol/L, and the liquid-solid ratio is controlled at 4 mL/g; by adding the oxidant $H_2O_2$, the oxidation potential is controlled at 950±10 mV to realize the selective leaching of Se elements; and the leaching residue enters the reactor 4 #; and (4) in the reactor 4 #, the reaction duration is controlled at 50 min and the temperature is controlled at 70° C. In the process, a 0.04 mol/L $Na_2S_2O_3$ solution is used, and the liquid-solid ratio of the $Na_2S_2O_3$ to the leaching residue is 10 mL/g, and $Ag^+$ is complexed from the leaching residue.

The ion concentrations of leaching solutions for different phases are determined by ICP-OES, and the leaching rates of Cu, Te, Se, and Ag are 99.81%, 99.52%, 99.33% and 99.16%, respectively, with the realization of graded and efficient leaching and highly selective separation of each element.

Embodiment 5

The process for selectively separating valuable metals from copper anode slime includes the following steps:

$H_2SO_4$ is used as the leaching solution, and $H_2O_2$ is used to control the oxidation potential of oxidative leaching solution;

(1) the copper anode slime and the leaching solution are mixed and stirred in reactor 1 #, the reaction duration is controlled at 15 min, the temperature is controlled at 50° C., the sulfuric acid concentration is controlled at 1.75 mol/L, and the liquid-solid ratio is controlled at 10 mL/g; by adding the oxidant $H_2O_2$, the oxidation potential is controlled at 480±10 mV, so that the selective leaching of Cu elements is realized, and the leaching residue enters the reactor 2 #;

(2) in the reactor 2 #, the reaction duration is controlled at 80 min, the temperature is controlled at 40° C., the sulfuric acid concentration is controlled at 4.25 mol/L, and the liquid-solid ratio is controlled at 6 mL/g; by adding the oxidant $H_2O_2$, the oxidation potential is controlled at 780±10 mV, and the selective leaching of Te elements is realized, and the leaching residue enters the reactor 3 #;

(3) in the reactor 3 #, the reaction duration is controlled at 80 min, the temperature is controlled at 40° C., the concentration of sulfuric acid is controlled at 1.0 mol/L, and the liquid-solid ratio is controlled at 6 mL/g; by adding oxidant $H_2O_2$, the oxidation potential is controlled at 950±10 mV, so as to realize the selective leaching of Se elements, and the leaching residue enters the reactor 4 #; and (4) in the reactor 4 #, the reaction duration is controlled at 40 min and the temperature is controlled at 60° C. In the process, a 0.03 mol/L $Na_2S_2O_3$ solution is used, and the liquid-solid ratio of $Na_2S_2O_3$ to the leaching residue is 10 mL/g, so that the $Ag^+$ is complexed from the leaching residue.

The ion concentrations of the leaching solutions for different phases are determined by ICP-OES, and the leaching rates of Cu, Te, Se, and Ag are 99.47%, 99.20%, 99.68% and 99.19%, respectively, with the realization of graded and efficient leaching and highly selective separation of each element.

Embodiment 6

The process for selectively separating valuable metals from copper anode slime includes the following steps:

$H_2SO_4$ is used as the leaching solution, and $H_2O_2$ is used to control the oxidation potential of oxidative leaching solution;

(1) the copper anode slime and the leaching solution are mixed and stirred in the reactor 1 #, the reaction duration is controlled at 15 min, the temperature is controlled at 50° C., the sulfuric acid concentration is controlled at 1.75 mol/L, and the liquid-solid ratio is controlled at 10 mL/g; by adding the oxidant $H_2O_2$, the oxidation potential is controlled at 480±10 mV, so that the selective leaching of Cu elements is realized, and the leaching residue enters the reactor 2 #;

(2) in the reactor 2 #, the reaction duration is controlled at 80 min, the temperature is controlled at 40° C., the sulfuric acid concentration is controlled at 4.25 mol/L, and the liquid-solid ratio is controlled at 6 mL/g; by adding the oxidant $H_2O_2$, the oxidation potential is controlled at 820±10 mV, and the selective leaching of Te elements is realized, and the leaching residue enters the reactor 3 #;

(3) in the reactor 3 #, the reaction duration is controlled at 80 min, the temperature is controlled at 40° C., the sulfuric acid concentration is controlled at 4.25 mol/L, and the liquid-solid ratio is controlled at 6 mL/g; by adding the oxidant $H_2O_2$, the oxidation potential is controlled at 820±10 mV to realize the selective leaching of Se elements, and the leaching residue enters the reactor 4 #; and (4) in the reactor 4 #, the reaction duration is controlled at 40 min and the temperature is controlled at 60° C. In the process, a 0.03 mol/L $Na_2S_2O_3$ solution is used, and the liquid-solid ratio of $Na_2S_2O_3$ to the leaching residue is 10 mL/g, so that the $Ag^+$ is complexed from the leaching residue.

The ion concentrations of the leaching solutions for different phases are determined by ICP-OES, and the leaching rates of Cu, Te, Se, and Ag are 99.37%, 99.74%, 0.02% and 99.29%, respectively, with the realization of graded and efficient leaching and highly selective separation of each element.

Embodiment 7

The process for selectively separating valuable metals from copper anode slime comprises the following steps:

$H_2SO_4$ is used as the leaching solution, and $H_2O_2$ is used to control the oxidation potential of oxidative leaching solution;

(1) the copper anode slime and the leaching solution are mixed and stirred in reactor 1 #, the reaction duration is controlled at 18 min, the temperature is controlled at 70° C., the concentration of sulfuric acid is controlled at 1.75 mol/L, and the liquid-solid ratio is controlled at 6 mL/g. By adding the oxidant $H_2O_2$, the oxidation potential is controlled at 480±10 mV, so that the selective leaching of Cu elements is realized, and the leaching residue enters reactor 2 #;

(2) in the reactor 2 #, the reaction duration is controlled at 100 min, the temperature is controlled at 50° C., the sulfuric acid concentration is controlled at 1.5 mol/L, and the liquid-solid ratio is controlled at 4 mL/g; by adding the oxidant $H_2O_2$, the oxidation potential is controlled at 820±10 mV, and the selective leaching of Te elements is realized, and the leaching residue enters the reactor 3 #;

(3) in the reactor 3 #, the reaction duration is controlled at 100 min, the temperature is controlled at 50° C., the concentration of sulfuric acid is controlled at 1.5 mol/L, and the liquid-solid ratio is controlled at 4 mL/g; by adding the oxidant $H_2O_2$, the oxidation potential is controlled at 820±10 mV, so as to realize the selective leaching of Se elements, the leaching residue enters the reactor 4 #; and (4) in the reactor 4 #, the reaction duration is controlled at 50 min and the temperature is controlled at 70° C. In the process, a 0.04 mol/L $Na_2S_2O_3$ solution is used, and the liquid-solid ratio of $Na_2S_2O_3$ to the leaching residue is 10 mL/g, and the $Ag^+$ is complexed from leaching residue.

The ion concentrations of leaching solutions for different phases are determined by ICP-OES, and the leaching rates of Cu, Te, Se, and Ag are 99.76%, 0.04%, 99.63% and 99.21%, respectively, with the realization of graded and efficient leaching and highly selective separation of each element.

The above-mentioned embodiments only describe the preferred mode of the present disclosure, and do not limit the scope of the present disclosure. Under the premise of not departing from the design spirit of the present disclosure, various modifications and improvements made by ordinary technicians in the field to the technical scheme of the present disclosure shall fall within the protection scope determined by the claims of the present disclosure.

What is claimed is:

1. A separation process of valuable metals from copper anode slime based on oxidation potential modulation, comprising following steps:

mixing copper anode slime with an acidic leaching solution with a $H^+$ concentration of 3.0-8.0 mol/L, adding an oxidant to control an oxidation potential to 400-500 mV, and leaching Cu elements; filtering to obtain a filter residue, followed by mixing with an acidic leaching solution with a $H^+$ concentration of 8.0-10.0 mol/L, adding an oxidant to control an oxidation potential to 650-850 mV, and leaching Te elements; filtering to obtain a filter residue, followed by mixing with an acidic leaching solution with a $H^+$ concentration of 1.0-4.0 mol/L, adding an oxidant to control an oxidation potential to 800-1,200 mV, and leaching Se elements; filtering to obtain a filter residue, followed by mixing with a solution of thiosulfate with a concentration of 0.025-0.05 mol/L of $S_2O_3^{2-}$ to complex Ag elements; wherein in a process of leaching Cu elements, the oxidant is one or more of $H_2O_2$, $O_3$ and $O_2$; and an acid of the acidic leaching solution is sulfuric acid;

in the process of leaching Cu elements, a leaching duration is 10-20 min and a leaching temperature is 30-80° C.;

in a process of leaching Te elements, the oxidant is one or more of $H_2O_2$, $O_3$ and $O_2$; and an acid of the acidic leaching solution is sulfuric acid;

in the process of leaching Te elements, a leaching duration is 60-120 min and a leaching temperature is 30-60° C.;

in a process of leaching Se elements, the oxidant is one or more of $H_2O_2$, $O_3$ and $O_2$; and an acid of the acidic leaching solution is sulfuric acid; and in the process of leaching Se elements, a leaching duration is 60-120 min and a leaching temperature is 30-60° C.

2. The separation process of valuable metals from copper anode slime based on oxidation potential modulation according to claim 1, wherein in a process of complexing Ag elements, the thiosulfate is sodium thiosulfate or potassium thiosulfate.

3. The separation process of valuable metals from copper anode slime based on oxidation potential modulation according to claim 1, wherein in a process of complexing Ag elements, a reaction duration is 30-90 min and a reaction temperature is 50-80° C.

* * * * *